United States Patent [19]

Martin

[11] Patent Number: 4,540,329

[45] Date of Patent: Sep. 10, 1985

[54] SAFETY LOCK FOR TAILGATE LIFT

[75] Inventor: Paul Martin, Toronto, Canada

[73] Assignee: Diesel Equipment Limited, Toronto, Canada

[21] Appl. No.: 479,157

[22] Filed: Mar. 28, 1983

[51] Int. Cl.³ .............................................. B60P 1/46
[52] U.S. Cl. .................... 414/545; 414/540; 414/674; 254/89 H; 187/80
[58] Field of Search ........................ 414/540, 545, 674; 187/8.47, 8.49, 8.5, 80, 81, 71; 254/47, 89 H

[56] References Cited

U.S. PATENT DOCUMENTS

| 276,784 | 5/1883 | Daso | 187/80 |
|---|---|---|---|
| 2,635,771 | 4/1953 | Black | 414/540 |
| 2,788,864 | 4/1957 | Sanders et al. | 187/80 |
| 3,275,170 | 9/1966 | MacRae et al. | 414/545 |
| 3,282,449 | 11/1966 | Buford | 414/540 |

FOREIGN PATENT DOCUMENTS 119415 10/1918 United Kingdom ................. 187/81

Primary Examiner—Robert J. Spar
Assistant Examiner—Ken Muncy
Attorney, Agent, or Firm—Fetherstonhaugh & Co.

[57] ABSTRACT

A safety locking mechanism for locking a hoist, such as a power operated tailgate, with repect to its supporting structure comprises: a pair of latch arms which are connected to one another by a flexible cable. A pair of power transmission chains connect the hoist to a power source. A pair of tension sensing lever arms are pivotally mounted and arranged to detect the presence or absence of a normal loading tension in the power transmission chains. The flexible cable also engages each of the tension sensing levers and is held by them in a position in which it retains the latch arms in a released position when a normal loading tension is detected in the power transmission chains. The latch arms will both move to a latching position locking the hoist when the absence of a normal loading tension is detected in the power transmission chains. The latch arms are made of a material which has a greater hardness than that of the slide members which support the platform so as to become embedded in the slide member when in the latching position.

4 Claims, 6 Drawing Figures

SAFETY LOCK FOR TAILGATE LIFT

FIELD OF INVENTION

This invention relates to power operated hoists. In particular, this invention relates to an improved safety locking mechanism for power operated hoists.

PRIOR ART

Power operated hoists in the form of tailgates are commonly used in the loading and unloading of trucks. One such power operated tailgate is described in U.S. Pat. No. 3,275,170 Mac Rae et al. and assigned to Diesel Equipment Limited.

The mechanism used for hoisting the power operated tailgate generally includes a pair of chains which connect a winding mechanism to opposite sides of the platform assembly.

During operation of the hoist, the chains are held in tension by the weight of the platform and any load mounted thereon. If one or both of the chains should break in use, the platform would fall under its own weight and could cause injury to the operator and damage the tailgate and the load carried thereby. The probabilities are that a failure would be in the form of a break in one chain, with the result that one side of the platform would tend to fall thus applying a substantial distorting load to the slide members and their associated guides which could result in damage to the hoist mechanism to an extent that the mere replacement of the chain would not render the hoist operable.

The present invention overcomes the difficulties of the prior art described above and provides a simple and efficient safety locking mechanism for locking the hoist with respect to its supporting structure in the event of a break in the power transmission members used to raise the hoist.

According to one aspect of the present invention, there is provided in a power operated hoist having a load support mechanism which includes a longitudinally elongated slide member, a hoist mechanism including a flexible power transmission member drivingly connected to said slide member for suspending the slide member and platform from the hoist mechanism and for raising and lowering the slide member and platform in response to operation thereof, said flexible power transmission member being subjected to a normal tensioning load when supporting, raising and lowering said slide member, the improvement of; first latch means disposed adjacent said slide member, said first latch means being movable between the latching position engaging and locking said slide to prevent lowering thereof and a release position out of locking engagement with said slide member, latch actuating means for moving said latch means between said latching position and said release position, said latch actuating means including detector means for detecting the presence or absence of said normal tensioning load in said flexible power transmission member, said latch actuating means retaining said latch means in the release position when a normal tensioning load is detected in said power transmission member and moving said latching means to its latching position when said detecting means detects the absence of normal tensioning load in said power transmission member.

SUMMARY OF INVENTION

According to one aspect of the invention, there is provided in a power operated hoist having a platform mounted on first and second longitudinally elongated slide members arranged one at either side of the platform and extending upwardly therefrom, a hoist mechanism including first and second flexible power transmission members drivingly connected to said first and second slide members respectively for suspending the slide members and platform from the hoist mechanism and for raising and lowering the slide members and platform in response to operation thereof, said flexible power transmission members being subjected to a normal tensioning load when supporting, raising and lowering said slide members, the improvement of first and second latch means associated with said first and second slide members respectively, said first and second latch means each being movable between the latching position engaging and locking its associated slide to prevent lowering thereof and a release position out of locking engagement with its associated slide, latch actuating means for moving said latch means between said latching position and said release position, said latch actuating means including first and second detector means for detecting the presence or absence of said normal tensioning load in said first and second power transmission members respectively, said latch actuating means retaining said first and second latch means in their release position when a normal tensioning load is detected in the first and second power transmission members respectively and moving said first and second latching means to its latching position when said detecting means detects the absence of normal tensioning load in said first and second power transmission members respectively.

According to a further aspect of the present invention, there is provided a power operated tailgate for use in association with a truck body comprising, a load supporting platform, first and second longitudinally elongated slide members mounted one at either side of said platform and extending upwardly therefrom, a frame including first and second guide members mountable on said body and adapted to guide the first and second slide members respectively as they are raised and lowered in use, a hoist mechanism for raising and lowering said platform comprising a winding mechanism mounted on said frame, first and second power transmission chains each having one end in driving engagement with the winding mechanism and the other ends thereof being connected to the first and second slide members respectively whereby the weight of said platform and slide members is applied as a tensioning load to said chains, said winding mechanism being operable to wind-in and pay-out said chains to raise or lower said platform, first and second detector means each having a chain slipway extending therethrough, said detector means being mounted for movement relative to said frame between a first position and a second position, said first and second chains extending through the slipways of said first and second detectors respectively and, when subjected to said normal tensioning loads, supporting said detector means in said first position, said first and second detector means being adapted to move to said second position in response to a break in said first and second chains respectively, and first and second latch means mounted on said frame adjacent said first and second slide members respectively, said first and second latch means each being movable between the latching position engaging and locking its associated slide to prevent lowering thereof and a release position out of locking engagement with its associated slide, latch actuating means for moving said latch means between said latching position and said release position, said latch actuating means including first and second detector means for detecting the presence or absence of said normal tensioning load in said first and second power transmission members respectively, said latch actuating means retaining said first and second latch means in their release position when a normal tensioning load is detected in the first and second power transmission members respectively and moving said first and second latching means to its latching position when said detecting means detects the absence of normal tensioning load in said first and second power transmission members respectively.

PREFERRED EMBODIMENT

The invention will be more clearly understood after reference to the following detailed specification read in conjunction with the drawings, wherein.

Figure 1:
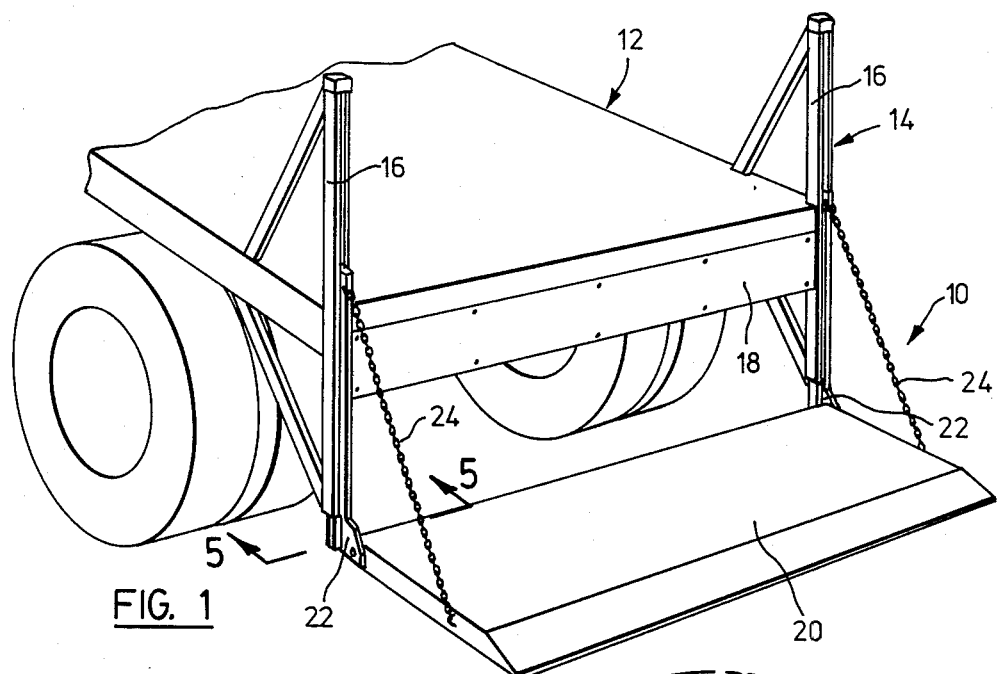
FIG. 1 is a pictorial view of a power operated hoist mounted as a tailgate at the back end of a truck.

With reference to FIG. 1 of the drawings, the reference numeral 10 refers generally to a power operated hoist in the form of a tailgate mounted at the rear of a truck body 12. The power operated hoist 10 includes a stationary frame generally identified by the numeral 14 which includes a pair of vertically oriented guide members 16 and a housing 18 which extends transversely therebetween.

The movable component of the hoist includes a platform 20 which is pivotably mounted at its inner end on longitudinally elongated slide members 22. The slide members 22 are slidable in passages formed in the guides 16. Flexible power transmission members in the form of chains 24 extend between the upper end of the slide members 22 and the platform to support the platform in the horizontal position when the hoist is in use. It will be understood that the platform 20 is movable about its pivotal connection with the slides 22 to an upright position to form a tailgate closing the back end of the truck as required in use.

Figure 2:
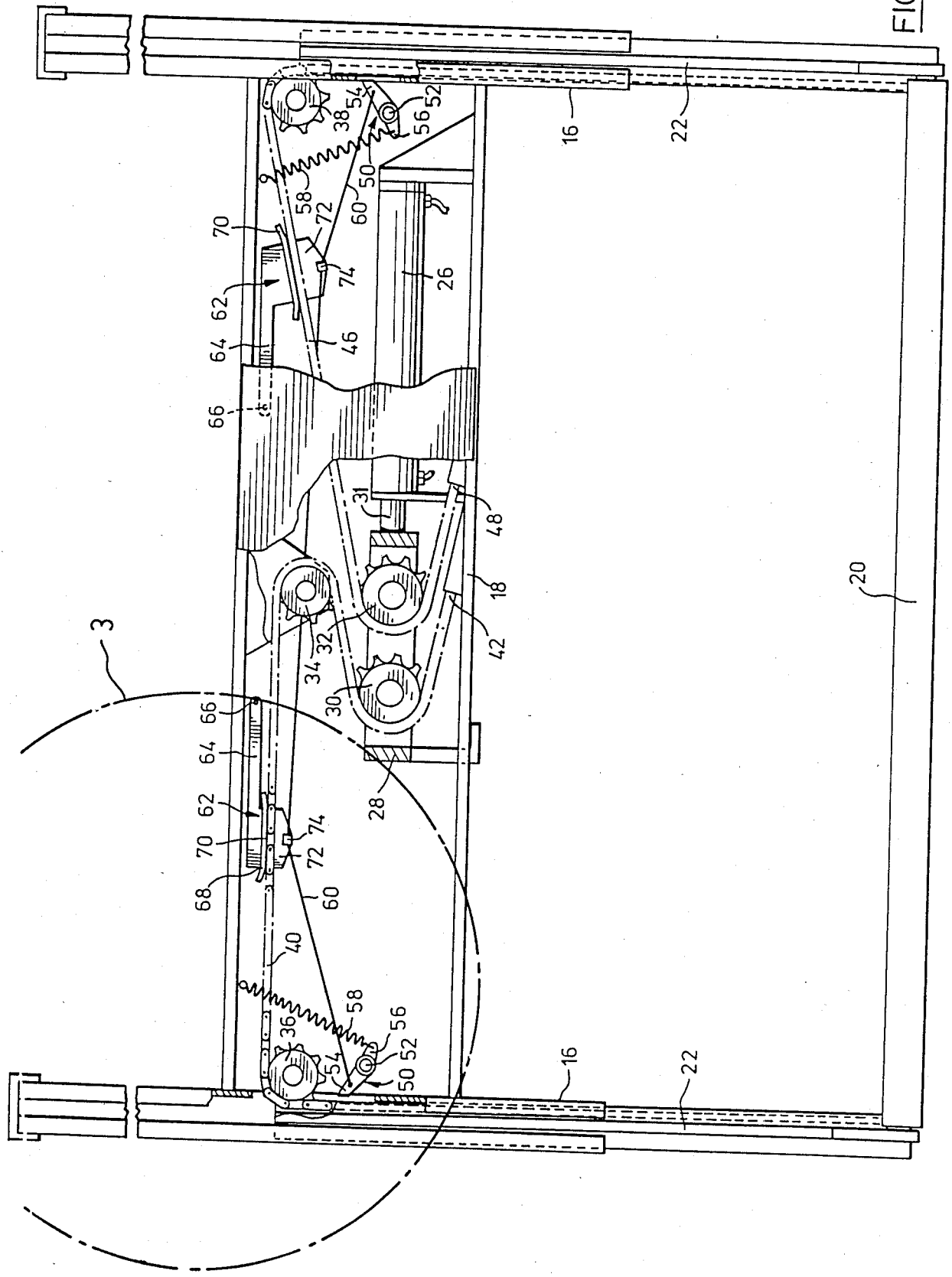
FIG. 2 is a front view of the hoist mechanism of FIG. 1 showing the hoist mechanism in more detail.

The mechanism which is used for raising and lowering the platform while it is in the horizontal position is best illustrated in FIGS. 2, 3, 4 and 5 of the drawings. As shown in FIG. 2, an hydraulic cylinder 26 is mounted in transverse housing 18. A carriage 28 is mounted at the outer end of the reciprocating shaft 31 of the cylinder 26 and a pair of sprockets 30 and 32 are mounted on the carriage 28. Sprockets 34,36 and 38 are also mounted in the housing 18. A first power transmission chain 40 has its inner end 42 secured with respect to the housing 18 and its outer end 44 (FIG. 5) secured with respect to the lower end of its associated slide member 22. A second power transmission chain 46 has its inner end 48 secured with respect to the housing 18 and its outer end secured with respect to the other slide member 22 in a like manner to that in which the outer end 44 of the first transmission chain is connected to its associated slide member 22.

In extending from the inner end 42 to the outer end 44, the first power transmission chain extends around sprockets 30, 34 and 36. Similarly in extending from its inner end to its outer end, the second power transmission chain extends around sprockets 32 and 38.

In FIG. 2 of the drawings, the slide member 28 is shown in the position which it will assume when the platform 20 is in its lowered position with respect to the truck body. The platform 20 may be raised by activating the hydraulic cylinder 26 to move the slide member 28 to the left of the position shown in FIG. 2. This will cause a simultaneous winding-in of the first chain 40 and second chain 46 with respect to the slide member. This in turn raises the platform.

The mechanism described with reference to the drawings to this point is known in the art. The problem with this mechanism is that in the event of a break in either of the chains 40 or 46, one side or the other or both sides of the platform will drop under its own weight to ground level.

This difficulty is overcome by the provision of the safety latching mechanism described hereinafter.

This latching mechanism is designed to effect a rapid braking of the movement of the slide members 22 with respect to the guide members 16. The latch mechanism includes a pair of latch levers 50 which are mounted for rotation on support shafts 52 carried by the housing 18. The latch levers 50 have a latching arm 54 and a biasing arm 56 projecting from opposite sides of the support shaft 52. A tensioning spring 58 extends between the biasing arm 56 and the housing 18 and is preloaded to bias the latch levers for rotation of the latch arm 54 toward its associated slide member 22. A cable 60 connects the latching arms 54 of the latch levers and extends transversely across the housing.

In order to detect the presence or absence of a normal tensioning load in the chains 40 and 46, first and second detector arms 62 are provided.

Figure 3:
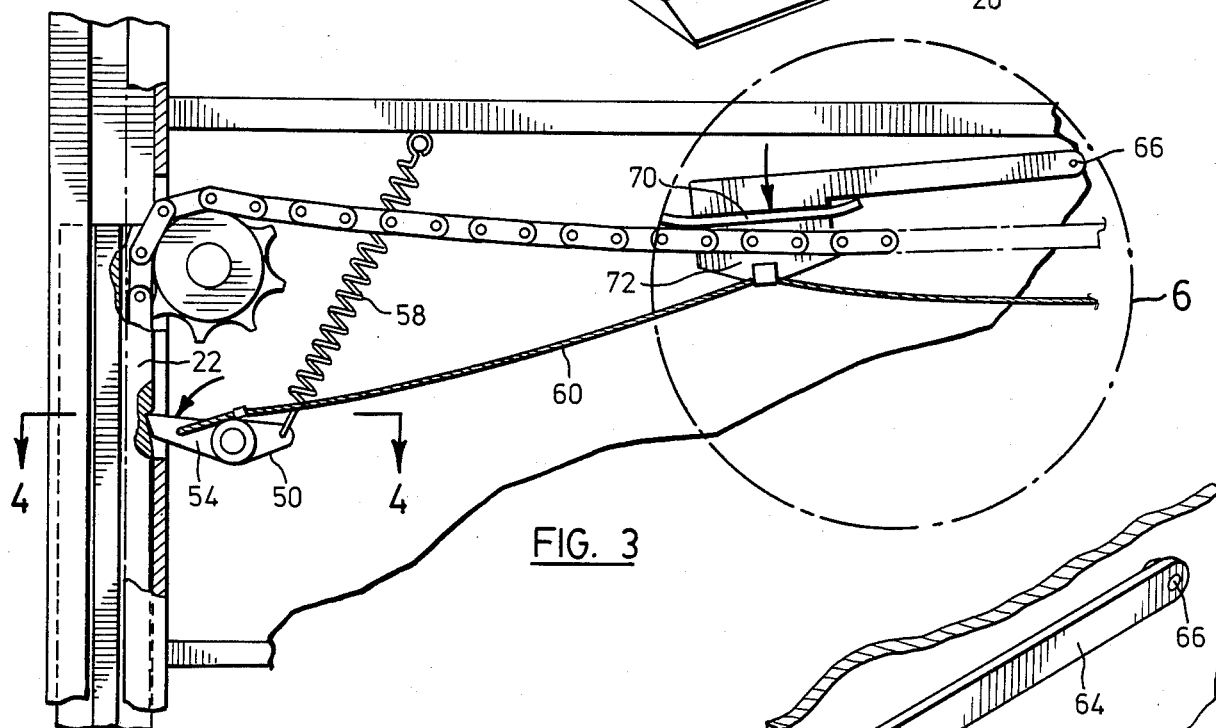
FIG. 3 is an enlarged view at the area indicated 3 in FIG. 2 showing the latch mechanism in latching position.
Figure 4:
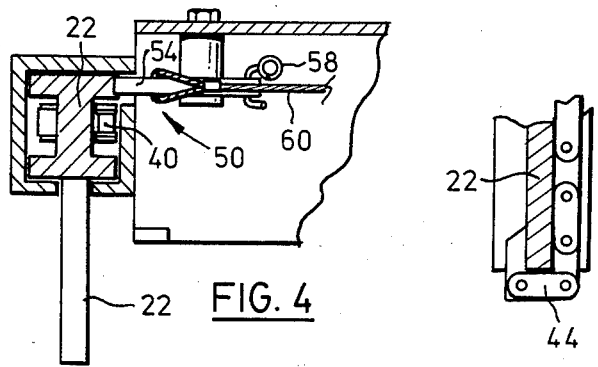
FIG. 4 is a sectional view along the line 4—4 of FIG. 3.
Figure 5:
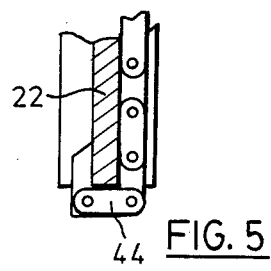
FIG. 5 is a sectional view through the slide member taken along the line 5—5 of FIG. 1.
Figure 6:
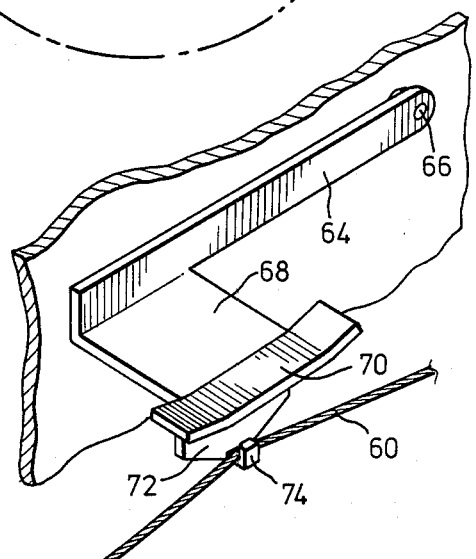
FIG. 6 is an enlarged view of the detector member illustrated at 6 in FIG. 3.

As shown in FIGS. 2 and 6, the detector arms 62 each include a lever 64 which is pivotably mounted at one end on a pivot pin 66. A plate 68 projects outwardly from the other end of the lever 64 and has a flange 70 projecting laterally outwardly therefrom. A second flange 72 projects downwardly from the flange 70 and cooperates therewith to form a chain slipway, as shown in FIG. 3. An L-shaped bracket 74 projects outwardly from the flange 72 and serves to form a cable slipway for the cable 60.

In the normal operation of the hoist, the chains 40 and 46 are held taut by the weight of the platform and its supporting structure. When taut, the chains 40 and 46 support their respective detector arms 62 in the raised position shown in FIG. 2 and the detector arms in turn support the cable 60 in a position holding the latching arms 54 out of engagement with their respective slides 22. In the event of a break in either one of the chains 40 or 46, its associated detector arm 62 will pivot about its pivot pin 66 under its own weight to a lowered position as shown in FIG. 3 of the drawings. This will slacken the cable 60, thus permitting the biasing spring 58 to rotate the latching levers 50 to a latching position in which the latching arms 54 thereof project into and are embedded in the body of the slide members 22.

To permit the latching arm 54 to be embedded in the body of the slide 22, the latch arms 54 are made from a metal which is substantially harder than the metal from which the slide members 22 are made. Preferably the slide members 22 are made from an aluminum alloy and the latch levers 50 are made from a hardened steel. It will be noted that if one or other of the chains 40 and 46 break, both latching levers will be activated by reason of the fact that the cable 60 is connected to both and any reduction in tension in the cable 60 will cause simultaneous actuation of both latch levers.

From the foregoing it will be apparent that the apparatus of the present invention provides a simple and efficient mechanism for securely locking the slide members of the platform assembly in a fixed position in the event of a failure of the hoist mechanism.

Various modifications of the present invention will be apparent to those skilled in the art without departing from the scope of the invention. For example, the cable 60 might in certain applications be made in two sections so that one latching lever is operated independently of the other.

In addition, it will be apparent that the platform could be supported by a single slide member connected by a single chain to the hoist mechanism in which case only one latching mechanism and detector mechanism would be required. Furthermore, the load support mechanism or platform could be in the form of one or more narrow support arms.

What I claim as my invention is:

1. In a power operated hoist having a frame, a load support mounted on first and second longitudinally elongated slide members arranged one at either side of the load support and extending upwardly therefrom, a hoist mechanism including first and second flexible power transmission members drivingly connected to said first and second slide members respectively for suspending the slide members and load support from the hoist mechanism and for raising and lowering the slide members and load support in response to operation thereof, said flexible power transmission members being subjected to a normal tensioning load when supporting, raising and lowering said slide members, the improvement of;
   (a) first and second latch arms pivotally mounted adjacent said first and second slide members respectively, said first and second latch arms each being movable between the latching position engaging and locking their associated slide to prevent lowering thereof and a released position out of locking engagement with its associated slide, and
   (b) latch actuating means for moving said latch arms between said latching position and said release position, said latch actuating means comprising;
      (i) means normally urging said latch arms to said latching position,
      (ii) first and second tension detector levers pivotally mounted on said frame for movement between a raised position and a lowered position, each of said first and second tension detector levers having a free end engaging said first and second flexible power transmission members respectively so as to be retained in said raised position when their associated flexible power transmission member is subjected to a normal tensioning load and lowered to said lowered position when the tension in their associated flexible power transmission members drops below a predetermined amount,
      (iii) a flexible connector connecting said first and second latch means, said flexible connector engaging said first and second tension detector levers so as to be retained by said first and second tension detector levers in a position retaining said first and second latch arms in their release position when a normal tensioning load is detected in said first and second power transmission members respectively, said flexible connector being slackened when either one of said first or second tension detector levers moves away from its raised position so as to cause movement of said first and second latching arms to their latching position when said detector levers detect the absence of a normal tensioning load in said first or second power transmission members respectively.

2. A power operated hoist as claimed in claim 1 wherein said latch arms are made of a material which has a greater hardness than said slide member and a length to extend into an embedded relationship with the slide member when in said latching position.

3. A power operated tailgate for use in association with a truck body comprising:
   (a) a load supporting platform,
   (b) first and second longitudinally elongated slide members mounted one at either side of said platform and extending upwardly therefrom,
   (c) a frame including first and second guide members mountable on said body and adapted to guide the first and second slide members respectively as they are raised and lowered in use,
   (d) a hoist mechanism for raising and lowering said platform comprising;
      (i) a winding mechanism mounted on said frame,
      (ii) first and second power transmission chains each having one end in driving engagement with the winding mechanism and the other ends thereof being connected to the first and second slide members respectively whereby the weight of the platform and slide members is applied as a tensioning load to said chains,
      (iii) said winding mechanism being operable to wind-in and pay-out said chains to raise or lower said platform,
   (e) first and second detector levers each having a chain slipway extending therethrough, said detector levers being mounted on said frame for movement between a first position and a second position, said first and second chains extending through the slipways of said first and second levers respectively and, when subjected to said normal tensioning loads, supporting said detector levers in said first position, said first and second detector levers being adapted to move to said second position in response to a break in said first or second chains respectively, and
   (f) first and second latch arms pivotally mounted on said frame adjacent first and second slide members respectively, said first and second latch arms each being movable between a latching position engaging and locking its associated slide member to prevent lowering thereof and a release out of lock engagement with its associated slide,
   (g) latch actuating means for moving said latch arms between said latching position and said release position, said latch actuating means comprising;
      (i) means normally urging said latch arms to said latching position, (ii) a flexible connector connecting said first and second latch means, said flexible connector engaging said first and second tension detector levers so as to be retained by said first and second tension detector levers in a position retaining said first and second latch arms in their release position when a normal tensioning load is detected in said first and second power transmission members respectively, said flexible connector being slackened when either one of said first or second tension detector levers moves away from its raised position so as to cause movement of said first and second latching arms to their latching position when said detector levers detect the absence of a normal tensioning load in said first or second power transmission members respectively.

4. A power operated tailgate as claimed in claim 3 wherein said first and second latch arms are made of a material which has a greater hardness than their associated said slide member and a length to extend into an embedded relationship with their associated the slide member when in said latching position.

* * * * *